(12) United States Patent
Yue et al.

(10) Patent No.: US 8,993,170 B2
(45) Date of Patent: Mar. 31, 2015

(54) COMPOSITE CARBON MATERIAL OF NEGATIVE ELECTRODE IN LITHIUM ION BATTERY AND ITS PREPARATION METHOD

(75) Inventors: Min Yue, Guang Dong (CN); Wanhong Zhang, Guang Dong (CN)

(73) Assignee: BTR New Energy Materials Inc., Shenzhen, Guangdong (CN)

( * ) Notice: Subject to any disclaimer, the term of this patent is extended or adjusted under 35 U.S.C. 154(b) by 701 days.

(21) Appl. No.: 11/921,205

(22) PCT Filed: Mar. 29, 2006

(86) PCT No.: PCT/CN2006/000547
§ 371 (c)(1),
(2), (4) Date: Nov. 27, 2007

(87) PCT Pub. No.: WO2006/125358
PCT Pub. Date: Nov. 30, 2006

(65) Prior Publication Data
US 2009/0136849 A1    May 28, 2009

(30) Foreign Application Priority Data

May 27, 2005  (CN) .......................... 2005 1 0034934

(51) Int. Cl.
*H01M 4/133*  (2010.01)
*H01M 4/1393*  (2010.01)
*H01M 4/583*  (2010.01)
(Continued)

(52) U.S. Cl.
CPC ............ *H01M 4/587* (2013.01); *H01M 4/1393* (2013.01); *H01M 10/0525* (2013.01); *Y02E 60/122* (2013.01)
USPC .......... 429/231.8; 427/77; 427/112; 427/113; 427/213.31; 427/228; 423/448; 423/460; 423/461

(58) Field of Classification Search
USPC ........ 429/231.8; 423/448, 460, 461; 427/112, 427/113, 213.31, 228
See application file for complete search history.

(56) References Cited

U.S. PATENT DOCUMENTS 5,595,838 A * 1/1997 Yamada et al. ............... 429/209
6,403,259 B1 * 6/2002 Kitagawa et al. .......... 429/231.4

FOREIGN PATENT DOCUMENTS

CN      1234618 A  * 11/1999
CN      1304187 A  *  7/2001
(Continued)

OTHER PUBLICATIONS

Li et al., Machine translation of CN 1234618 A, Nov. 1999.*
(Continued)

*Primary Examiner* — Sean P Cullen
(74) *Attorney, Agent, or Firm* — Raymond Y. Chan; David and Raymond Patent Firm

(57) ABSTRACT

A composite carbon material of negative electrode in lithium ion, which is made of composite graphite, includes a spherical graphite and a cover layer, wherein the cover layer is pyrolytic carbon of organic substance. Inserted transition metal elements are contained between layers of graphite crystal. Preparation of the negative electrode includes the steps of: crushing graphite, shaping to form a spherical shape, purifying treatment, washing, dewatering and drying, dipped in salt solution doped by transition metal in multivalence, mixed with organic matter, covering treatment, and carbonizing treatment or graphitization treatment. The negative electrode provides advantages of reversible specific capacity larger than 350 mAh/g, coulomb efficiency higher than 94% at first cycle, conservation rate for capacity larger than 8-% in 500 times of circulation.

1 Claim, 4 Drawing Sheets

(51) Int. Cl.
*H01M 10/0525* (2010.01)
*B05D 3/02* (2006.01)
*B05D 5/12* (2006.01)
*C01B 31/04* (2006.01)
*C09C 1/46* (2006.01)
*H01M 4/587* (2010.01)

(56) References Cited

FOREIGN PATENT DOCUMENTS

| | | | | |
|---|---|---|---|---|
| CN | 1557704 | A | * | 12/2004 |
| CN | 1558458 | A | * | 12/2004 |
| JP | 10106569 | A | * | 4/1998 |
| JP | 2000090930 | A | * | 3/2000 |

OTHER PUBLICATIONS

Yue, Machine translation of CN 1558458 A, Dec. 2004.*
Yue, Machine translation of CN 1557704 A, Dec. 2004.*
Aizawa et al., Machine translation of JP 10-106569 A, Apr. 1998.*
Fujiwara et al., Machine translation of JP 2000-090930 A, Mar. 2000.*
Li et al., Machine translation of CN 1234618 A, Oct. 1999.*
Gao et al., Machine translation of CN 1304187 A, Jul. 2001.*
Yue et al., Machine translation of CN 1557704 A, Dec. 2004.*
Yue et al., Machine translation of CN 1558458 A, Dec. 2004.*
Li et al., Human translation of CN 1234618 A, Oct. 1999.*
Gao et al., Human translation of CN 1304187 A, Jul. 2001.*
Yue et al., Human translation of CN 1557704 A, Dec. 2004.*
Yue et al., Human translation of CN 1558458 A, Dec. 2004.*
"Peracetic acid," http://en.wikipedia.org/wiki/Peracetic_acid, accessed: Jul. 31, 2013.*
"Spheroid," http://www.merriam-webster.com/dictionary/spheroidal, accessed: Aug. 1, 2013.*
"Spherical," http://www.merriam-webster.com/dictionary/spherical, accessed: Aug. 1, 2013.*

* cited by examiner

COMPOSITE CARBON MATERIAL OF NEGATIVE ELECTRODE IN LITHIUM ION BATTERY AND ITS PREPARATION METHOD

BACKGROUND OF THE PRESENT INVENTION

1. Field of Invention

The present invention relates to a material of negative electrode in battery and its preparation method, and particularly to a composite carbon material of negative electrode in lithium ion battery.

2. Description of Related Arts

From the 60's of last century, as the oil crisis and with the increasing of the population, resources shortage becomes a serious problem. In recent time, environment protect is also been concerned by people, so that green power has developed rapidly. Lithium ion (Li-ion) battery is a new generation of secondary battery after the Nickel metal hydride (NiMH) developed in 90's of last century. With the advantage of high voltage, large capacity, long cycle life, small self discharge current, no memory effect, etc., Li-ion battery is the first choice for most high-end consumer electronics and is also widely used in cutting edge technique field such as aerospace and military area. Nowadays, Li-ion battery is one of the most popular fields of research and development.

In current technique, the negative electrode of commercial Li-ion battery is mad of carbon from mostly petroleum coke and natural graphite. Particularly, natural graphite has the advantage of high capacity, good performance, extensive resource, low cost, and is widely used. But the natural graphite has high degree of graphitization. The crystal structure and the physical chemical properties of the peripheral and the bottom of the graphite microcrystalline vary largely. The reaction with the electrolyte is unevenly while the decomposition of the electrolyte mainly occurs at the peripheral of the graphite microcrystalline. As a result, the density of the passive film is poor. During the charging process, it is easy to embed the lithium ion solvate, and causes the swelling and collapse of the graphite layer, increases the irreversible capacity. Also, through the physical and chemical treatment, the attachment of the natural graphite to the electrode plate is relatively weak. During the charging-discharging cycle process, it is easy to fall out and affect the cycle life, especially with large charging-discharging current. Moreover, as the negative electrode of Li-ion battery, the natural graphite needs to be crushed in order to increase the surface area to store more lithium. To enable the embedding-moving out process, the graphite needs to be crushed less than 100 μm. As a lubricating material, graphite is pones to have sliding between layers, resulting in the smashing of crystal structure, and finally affect the charge-discharge capacity and high current change and discharge performance.

In order to improve the electrochemical properties of the graphite material, different techniques are used to change the characters of natural graphite and to modify the surface structure. Japan patent No. 2000-261046 published a method of thermal oxidation processing graphite powder, to change the state of the surface. Although the reaction of electrolyte and anode is improved, the discharging capacity is still low. U.S. Pat. No. 6,403,259 published a method of grinding natural or artificial graphite to coat a layer of carbon material. The method improves the properties of high temperature self discharging, and low temperature properties, but other aspects of the performance is unsatisfied.

SUMMARY OF THE PRESENT INVENTION

The major object of the present invention is to provide a composite carbon material of negative electrode (cathode) in Li-ion battery and its preparation method, in order to improve the reversible capability and the cycle stability of the Li-ion secondary battery.

Accordingly, in order to accomplish the above object, the present invention provides a negative electrode of Li-Ion battery, which is made of composite carbon material, comprising a graphite core having a spherical shape and a cover layer. The graphite has the micro property of spherical or near spherical appearance. The cover layer is organic pyrolytic carbon, wherein a transition metal element is embedded between graphite crystal layers.

The average particle diameter of the composite graphite negative electrode material is 5~60 μm, tap density is 0.7~1.5 g/cm$^3$, specific surface area is 0.5~4.0 m$^2$/g, graphite crystal layer spacing $d_{002}$ is between 0.3368~0.338 nm, the amount of transition metal elements embedded between graphite layers is 0.1~5% atom ratio.

According, the present invention also provides a method of preparing composite carbon material of negative electrode in Li-ion battery, comprises the steps of:

(a) forming the graphite with particle size from 45 to 500 μm to graphite powder by grinding or crushing at the speed of 3000 to 6000 rpm, for 10 to 90 minutes in a high-speed mill;

(b) shaping and making the graphite powder into spherical graphite at the speed of 600 to 3000 rpm, for 40 to 180 minutes in a low-speed impact sphere making mill;

(c) purifying the spherical graphite;

(d) washing the purified graphite with water until the pH value thereof is neutral, dewatering and drying;

(e) immersing the dried graphite into multi-valent transition metal slate solution with concentration from 0.1M to 8M for 1 to 48 hours, at the temperature of 25 to 100° C., filtering, dewatering and drying;

(f) mixing the graphite powder with 1~30% organic mixture to form a coated graphite; and (g) carbonizing or graphitizing the coated graphite, heating in protection gas at 450 to 3000° C., keeping temperature for 1 to 10 hours, cooling down to room temperature.

In the present invention, the graphite is one of natural flake graphite, microcrystalline graphite, artificial graphite, and mesocarbon microbeads.

Before the purification, the spherical graphite is classified by classifier to remove particles smaller than 5 μm and larger than 75 μm, to get the particles ranging from 5~75 μm, the tap density is 0.95~1.05 g/cm$^3$, specific surface area is 4.0~7.5 m$^2$/g.

During the purification process, the spherical graphite and oxidizer are fed into the reactor and are mixed with water for 5 to 15 minutes. Then, the mixture of graphite and oxidizer is repeatedly mixed and stirred for 1 to 20 hours at the temperature of 50 to 360° C. Then, the complexing agent is added into the mixture, wherein the time of complex reaction is 2 to 20 hours. After the purification, the contents of the trace elements in the graphite powder, Fe, Cu, Cr, Na, Ca, Zn, Mn, Al, Si, are all less than 50 ppm, and the total amount is less than 150 ppm.

After the complexing reaction, add water to wash for 10 to 60 minutes, then centrifugal dewater, dry at 100~360° C. until water is less than 0.2%.

The oxidant used in the purification is the mixture of two or three oxidants selected from the group consisting of hydrogen peroxide, peroxyacetic acid, chlorine dioxide, chlorine, sodium hydroxide, concentrated sulfuric acid, nitric acid, concentrated hydrochloric acid, and perchloric acid.

The complexing agent used in the purification is nitrilotriacetic acid, ferric chloride, nitrilotriacetic acid, hydrofluoric acid, phosphoric acid, hydrochloric acid or cholic acid complexing agent.

The doping multi-valent transition metal elements are Ag, Cu, Cr, Fe, Co, Ni, V, Mo or Sn, the salt solution is using nitrate, carbonate, sulfate, hydrochloride or complex salt containing doping elements.

When the graphite powder is immersed in the doping multi-valent transition metal salt solution, the solid-liquid weight ratio is 0.1~2, the amount of transition metal elements inserted between graphite layers is 1~10% atom ratio.

The coating material used in the mixed-coating is water-soluble polyvinyl alcohol, styrene-butadiene rubber emulsion SBR, carboxymethyl cellulose CMC, the organic solvent of polystyrene, polymethyl methacrylate, polytetrafluoroethylene, polyvinylidene difluoride, or polyacrylonitrile.

1~3% conductive agent is applied during mixed coating.

The conductive agent is acetylene black, carbon nanotube, carbon fiber or conductive carbon black.

The coating method is one of liquid coating, melt coating, and mixed solid coating.

The temperature increasing speed in the carbonization or graphitization is 1~10° C./min.

The high speed mill is using jet mill, high-pressure mill, or rod mechanical mill. The low speed sphere making mill is low speed impact sphere making mill, airstream scroll mill, ultra-micro pulverizer, ultra-micro ball mill, classifying impact powder mill, or pendulum mill. The classifier is using air classifier, jet classifier, sub-micron classifier, or ultra-micrometer classifier.

Comparing to current using techniques, this Li-ion secondary battery negative electrode material in this present invention has very good capability of embedding and removing lithium ion, and cycle stability. The reversible capacity is larger than 350 mAh/g, the Coulomb Efficiency of the first cycle is larger than 94%, after 500 cycles, the capacity remains more than 80%. The process of the preparation is simple, easy to operate, and is low cost.

These and other objectives, features, and advantages of the present invention will become apparent from the following detailed description, the accompanying drawings, and the appended claims.

Figure 1:
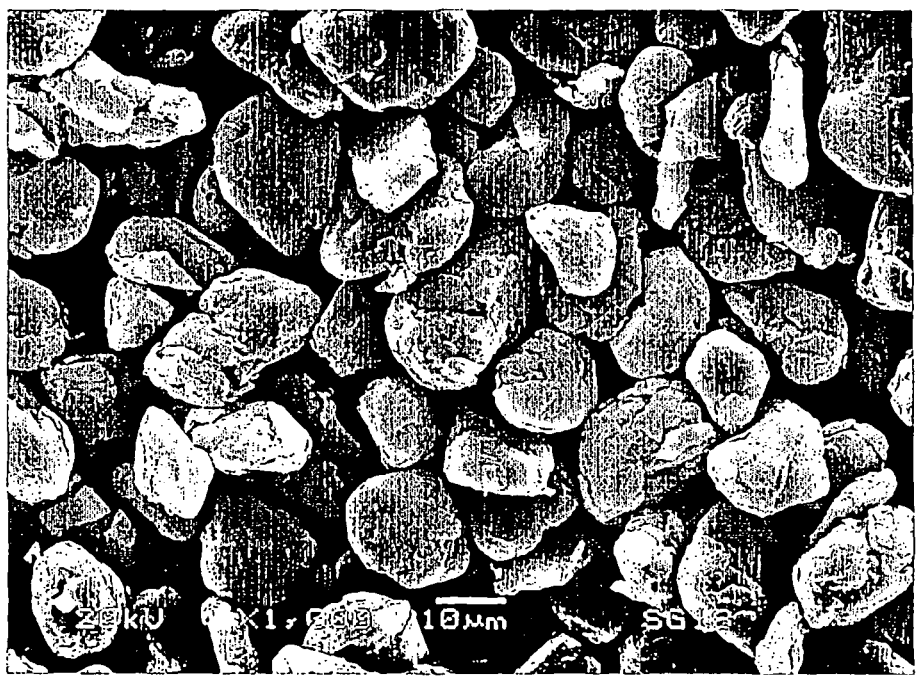
FIG. 1 is the SEM photograph of the spherical graphite after the treatment of making sphere of the present invention.

Table 1 illustrates the electrochemical properties of the composite carbon negative electrodes of the Li-ion battery.

DETAILED DESCRIPTION OF THE PREFERRED EMBODIMENT

The method of preparing a composite carbon made negative electrode in Li-ion battery, comprises the following steps.

(1) Form the graphite, such as the natural flake graphite, microcrystalline graphite, artificial graphite, or mesocarbon microbeads, into a graphite powder by grinding or crushing at a predetermined size at a predetermined speed for a predetermined period of time. The graphite powder has a particle size from 45 to 500 μm to graphite powder at the speed of 3000 to 6000 rpm, for 10 to 90 min in a jet mill, high-pressure mill, or rod mechanical mill.

(2) Shape and make the graphite powder into a graphite having a spherical shape in a mill machine with the speed of 600 to 3000 rpm for 40 to 180 minutes, wherein the mill machines can be a low speed impact sphere making mill, airstream scroll mill, ultra-micro pulverizer, ultra-micro ball mill, classifying impact powder mill, or pendulum mill.

(3) Classify the spherical graphite by air classifier, jet classifier, sub-micron classifier, or ultra-micrometer classifier to remove particles smaller than 5 μm and larger than 75 μm. Therefore, the spherical graphite is obtained with the particles ranging from 5~75 μm, with the tap density of 0.95~1.05 g/cm$^3$, specific surface area of 4.0~7.5 m$^2$/g.

(4) Mix the graphite with two or three different oxidants into reactor, wherein the oxidant is selected from the group consisting of hydrogen peroxide, peroxyacetic acid, chlorine dioxide, chlorine, sodium hydroxide, concentrated sulfuric acid, nitric acid, concentrated hydrochloric acid and perchloric acid. Then, water is mixed with the graphite and oxidants for 5 to 15 minutes. The mixture of graphite and oxidizer is repeatedly mixed and stirred for 1 to 20 hours at the temperature of 50 to 360° C. The complexing agent is added into the mixture, wherein the complexing agent is nitrilotriacelic acid, ferric chloride, nitrilotriacetic acid, hydrofluoric acid, phosphoric acid, hydrochloric acid or cholic acid. The time of complex reaction is 2 to 20 hours.

(5) Wash the material after the complexing reaction in a washing equipment, wherein water is continuously added to wash for 10 to 60 minutes until the pH value is neutral. Then, the material is dewatered and dried. After the purification, the contents of the trace elements in the graphite powder, Fe, Cu, Cr, Na, Ca, Zn, Mn, Al, Si, are all less than 50 ppm, and the total amount is less than 150 ppm.

(6) Immerse the dried graphite powder into multi-valent transition metal slate solution with concentration from 0.1M to 8M for 1 to 48 hours, at the temperature of 25 to 100° C., the metal elements are Ag, Cu, Cr, Fe, Co, Ni, V, Mo or Sn, then filtering, dewatering and drying.

(7) Mix the graphite powder with 1~30% organic matter to form a coated graphite, the coating material used in the mixed-coating is water-soluble polyvinyl alcohol, styrene-butadiene rubber emulsion SBR, carboxymethyl cellulose CMC, the organic solvent of polystyrene, polymethyl methacrylate, polytetrafluoroethylene, polyvinylidene difluoride, or polyacrylonitrile. The coating method is liquid coating, melt coating, or mixed solid coating. 1~3% conductive agent is adapted to be applied during mixed coating, the conductive agent is acetylene black, carbon nanotube, carbon fiber or conductive carbon black Super-P.

(8) Carbonize or graphitize the coated graphite, heating in protection gas at 450 to 3000° C., while the temperature is kept for 1 to 10 hours. Then, the coated graphite is cooled down to room temperature.

By studying the relationship between micro structure of the graphite powder and the character of charging/discharging, the inventor of the present invention developed the process, that grind and shape the graphite under certain conditions, then classify the graphite, and get spherical graphite powder with high tap density. The shape is modified from its original flake structure or irregular structure, into nearly spherical structure. The particle distribution area of this graphite powder is small and the specific surface area is small, so that the spherical surface area is the smallest. Another discovery is that, the tap density of the graphite powder significantly affects the discharging capacity of the carbon negative electrode of the Li-ion secondary battery. By increasing the tap density can improve the discharging capacity, and close to the hope value of the theoretical discharging capacity. Also, it is noticed that by powdering the graphite can increase the tap density, and reduce the specific surface area. The present invention provides a type of graphite powder material with the tap density of 0.95 g·cm³ or higher, and specific surface area of 7.0 m²/g or less.

The graphite powder is prepared through two processes. The process comprises grinding graphite into powder form by using high speed mechanical grinder, and making spherical graphite and classifying by using low speed sphere making treatment. Referring to FIG. 1, as illustrated in the SEM photograph, the shape of the graphite powder is approximately spherical.

If the graphite powder has the specific surface area larger than 7.0 m²/g, it will increase the reaction between the surface of the graphite and the electrolyte solution, and decrease the charging discharging Coulomb efficiency and the cycle life. Accordingly, the specific surface area is between 4.0 and 7.5 m²/g, preferably is 5.5 m²/g. But it is better to have a range between 4.0 and 6.5 m²/g. The specific surface area of the graphite is mainly affected by the grinding conditions, particularly by the duration of grinding.

The spherical graphite powder prepare by the process of the present invention also has these characters:

(A) The tap density of the processed natural spherical graphite powder is larger than 0.95 g·cm³.

(B) In the direction of C-axis of the graphite crystal, the size of the crystalline is in the range of 10~200 mm.

(C) The particle distribution is in the range of 5~75 μm.

(D) The geography is analyzed by SEM, the micro structure is spherical of approximately in spherical.

The size of the crystalline is measured in the direction of C-axis, if the size is less than 10 nm, the grinding will cause more lattice defects, and affect the capacity of embedded lithium ions. If the size is larger than 200 nm, it will affect the proliferation rate, which is not good to charge and discharge in large current. The size is better in the range of 50~150 nm.

The average particle diameter is the 50% of the cumulative curve of the particle diameter measured by laser diffraction/scattering method. If the average diameter is lesser than 5 μm, the surface area of the graphite is increased that it will lower the charging/discharging Coulomb efficiency. If the average diameter is larger than 60 μm, it needs more time for the lithium ions to distribute, and affects the discharging capacity, especially at larger current or low temperature. So the average diameter of the graphite powder is preferred to be controlled in the range of 5~60 μm. It is better that the graphite doesn't contain particles larger than 75 μm which is not good for large current discharging and low temperature performance, also it is not good to contain particles smaller than 5 μm which is not good for increasing the initial charging discharging efficiency. If the graphite powder contains coarse particles, when the negative electrode is packed in the battery shell, it is easy to apply force on the coarse particles and break the membrane between the anode and cathode and cause short circuit. It happens to irregular shaped graphite powder which has wider size distribution. When the average particle size is larger than 60 μm, there is more chance to contain irregular particles.

The graphite powder of the present invention is prepared through grinding, low speed sphere making, and classifying. The grinding is generally processed in high speed grinder. The equipment used is normally smash-shear grinder, impact mill, or airflow mill. In the sphere making process, the graphite powder is under low speed sphere making treatment which is optimized at the speed of 100~1000 rpm. This process can shape the graphite into nearly spherical structure.

Because it is inevitably to mix impurities into the raw material during the process of grinding, it is necessary to purify the graphite before used as the negative electrode. The current well known method is alkaline purification which is using sodium hydroxide at the temperature of 700~800° C., the impurities such as Si, Fe, Al, Ca, K, Na, Mg react with the sodium hydroxide as water soluble matters and are washed away by water. Some insoluble matters are dissolved by hydrochloric acid or sulfuric acid and are washed away by water. This method works with high temperature, the reagents are all acid and alkaline with strong corrosion. At the same time, the density of graphite is small, using water to wash will wash away a lot of graphite and causes a big waste. The purity using this technique can only reach 98~99.8%, cannot meet the requirement of negative electrode of Li-ion battery. Another method for purification is using high temperature, heating the graphite to 2700° C. and let the impurities to escape by gasification. But this technique has the disadvantage of long period of time, complex, high temperature, high energy cost. The present invention also provides the following method to purify graphite, which comprises the steps of:

(a) inputting the grinded raw graphite material and oxidants into reactor, and mixing with water for 5 to 15 minutes;

(b) repeatedly stirring the mixture for 1 to 20 hours at the temperature of 50 to 360° C.;

(c) adding complexing agent for complexing reaction for 2 to 10 hours;

(d) washing theses materials in washing equipment at the speed of 300 to 1500 rpm, by continuously adding water for 10 to 60 minutes until the pH value thereof is neutral; and (e) centrifugally dewatering and drying the mixture at 100~360° C. until the water in the graphite is less than 0.2%.

The purification technique of the present invention is using the mixture of two or three oxidants which are hydrogen peroxide, peroxyacetic acid, chlorine dioxide, chlorine, sodium hydroxide, concentrated sulfuric acid, nitric acid, concentrated hydrochloric acid, and perchloric acid.

The complexing agent used in the purification is nitrilotriacelic acid, ferric chloride, nitriloacetic acid, hydrofluoric acid, phosphoric acid, hydrochloric acid or cholic acid complexing agent.

The purity of the product is higher than 99.9%, After the purification, the contents of the trace elements in the graphite powder, Fe, Cu, Cr, Na, Ca, Zn, Mn, Al, Si, are all less than 50 ppm, and the total amount of the trace elements is less than 150 ppm. The product pass rate increases from 50~70% to 96% or above. The method is also simple, easy to operate, and in low cost.

In order to further improve the electrochemical properties of the graphite material, doping and surface treatment for the graphite is performed.

The graphite powder is then immersed into solution or gel containing multi-valent transition metallic element for doping for 1 to 48 hours, wherein the concentration of the solution or gel is from 0.1M to 8M, solid-liquid weight ratio is 0.1-2, reaction temperature is from 25 to 100° C. Then, the graphite powder is filtered and dried. The doping multi-valent transition metal element is one of the Ag, Cu, Cr, Fe, Co, Ni, V, Mo or Sn.

Figure 2:
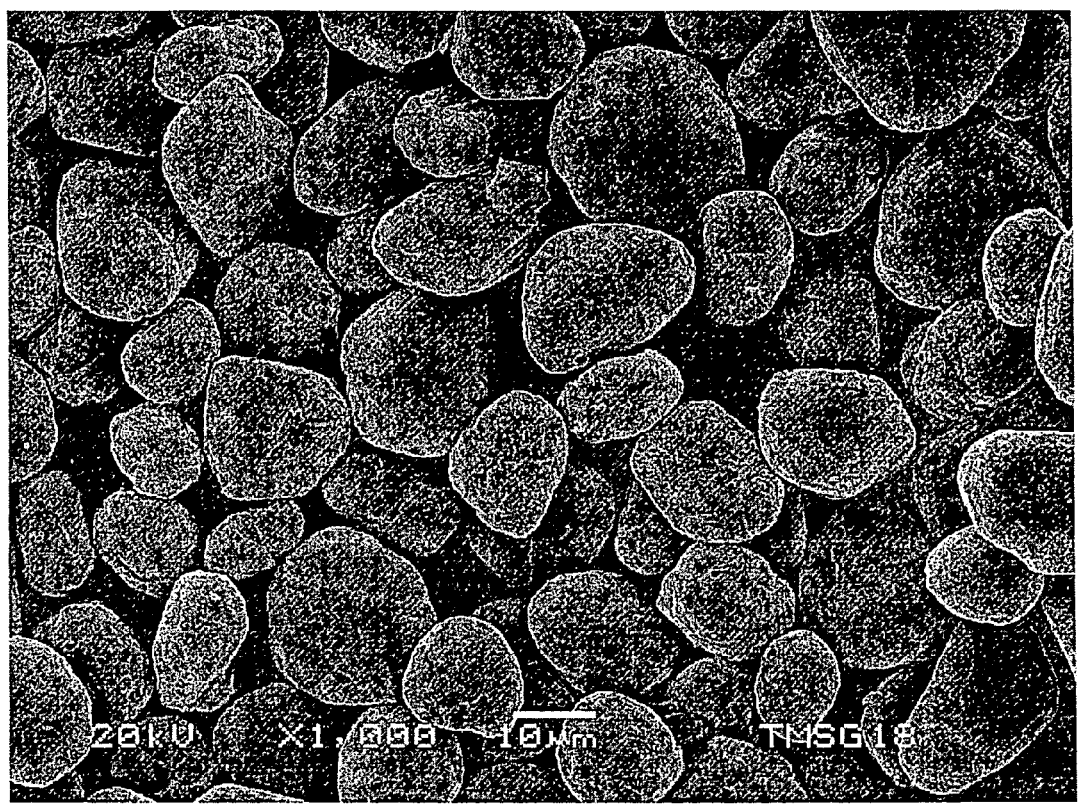
FIG. 2 is the SEM photograph of the composite carbon negative electrode of the Li-ion battery of the present invention.
Figure 3:
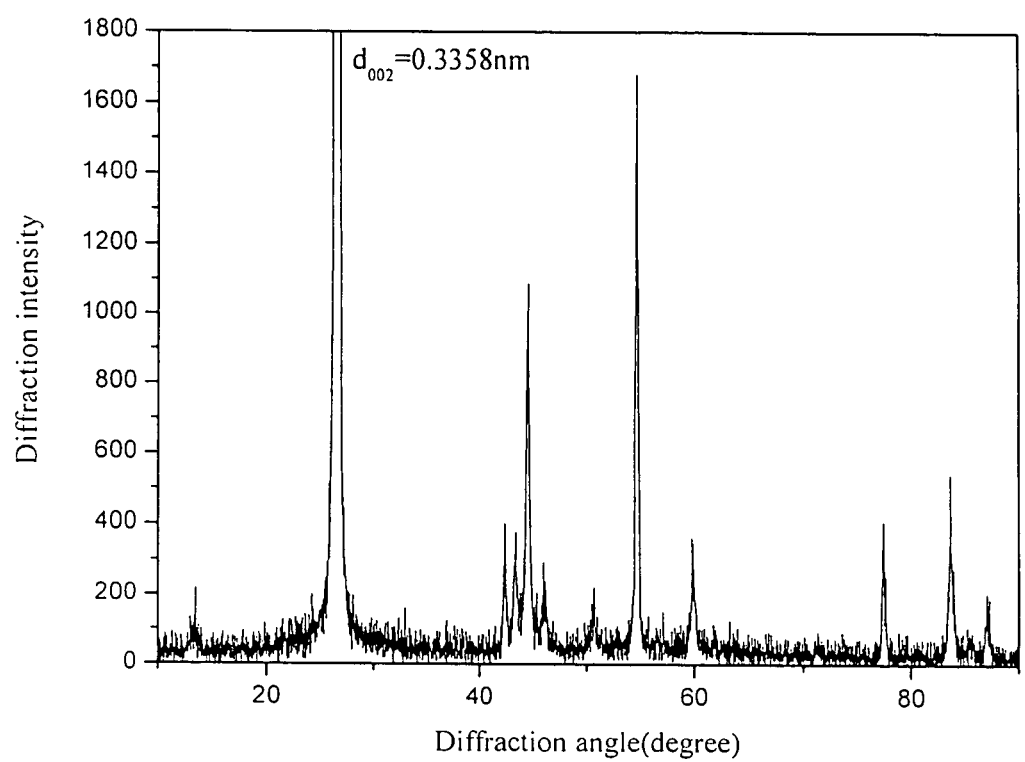
FIG. 3 is the XRD image of the spherical graphite before doping with the transition elements.
Figure 4:
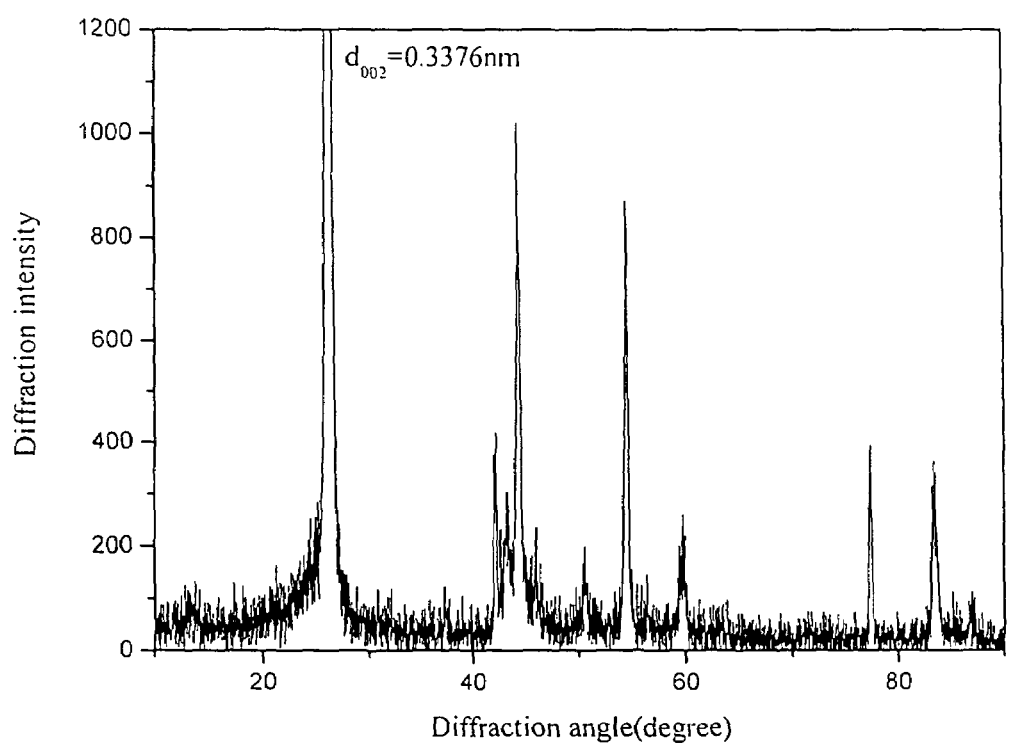
FIG. 4 is the XRD image of the spherical graphite after doping with the transition elements.

Referring to FIG. 2, the composite carbon made negative electrode of Li-ion battery is a composite graphite material comprising core and shell structure. The key point of the composite graphite is the spherical graphite particles, which has a spherical or nearly spherical micro structure, and is coated with a layer of organic pyrolytic carbon to improve the graphite compatibility of the electrolyte. The transition metal element is embedded between graphite crystal layers to increase the graphite crystal layer spacing, and to help the lithium ions to be embedded and removed. Thus, it enlarges the negative electrode material's capacity, and improves the charging/discharging capability with large current. Also, the larger graphite crystal spacing decreases the expansion and attraction caused by repeating of charging and discharging, and avoids damage and flaking of the graphite structure, improves the cycle ability. Referring to FIGS. 3 and 4, as analyzed by the XRD, inserting the transition metal elements into graphite crystal layers increased the layer spacing from the original 0.3358 nm to 0.3376 nm at $d_{002}$.

The precursor materials of the graphite coating materials are water-soluble polyvinyl alcohol, carboxymethyl cellulose CMC, styrene-butadiene rubber emulsion SBR, or the organic solvent of polystyrene, polymethyl methacrylate, polytetrafluoroethylene, polyvinylidene difluoride, or polyacrylonitrile. The coating method is one of liquid coating, melt coating, and mixed solid coating. The precursor materials is in the proportion of 1~30% of the graphite material. The protective gas is nitrogen, argon, helium, neon, or the mixture of these gases.

The composite carbon negative electrode material of Li-ion battery, prepared through the above process, has average particle diameter $D_{50}$ of 5~60 µm, tap density of 0.7~1.5 g/cm$^3$, specific surface area BET of 0.5~4.0 m$^2$/g. the specific surface area is measured by nitrogen replacement BET method, the average particle diameter is measured by Malvern laser scattering particle diameter analyzer, the tap density is measured by FZ4-4 tap density measurer developed by Beijing Iron and Steel Research Institute.

The First Embodiment

Grind the natural graphite with granularity of 500 µm, 90% carbon content, by the rotating high-speed grinder at 6000 rpm for 10 minutes, and then make the graphite into a spherical shape by the low-speed impact sphere making mill at 3000 rpm for 40 minutes. After the air classifier adjusts the particle size distribution into 5~75 µm, add 100 kg of this graphite into reactor, add 35 kg of a mixture of sulfuric acid and nitric acid, mix with water and stir at 300° C. for 10 minutes, and stir recirculate 18 hours. Add 15 kg ferric chloride, stir with water into paste form, and react for 2 hours. Cool down with water, and wash in the centrifugal filter equipment at the speed of 1000 rpm, continuously add water to wash for 30 minutes to a neutral pH value. Centrifugal dewater until the water content is less than 30%, bake try in oven at 105° C. for 2 hours until water is less than 0.2%. The carbon content of the sample is 99.96%. Take 200 g of above sample, immerse into 0.1M AgNO$_3$ solution at 100° C. for one hour, the solid-liquid ratio is 0.1. After filtering, washing, and drying, mix the graphite 191 g, carbon fiber 4 g, with 5 g SBR water solution for 2 hours. After drying, increase the temperature to 1000° C. with the speed of 10° C./min under the 5 liter/min nitrogen flow, keep this temperature for 2 hours, cool down to room temperature, and get the composite graphite.

Use the composite graphite to produce electrode through the following process: take 96 g composite graphite, 2.5 g SBR, 1.5 g CMC, mix uniformly with appropriate amount of pure water as dispersing agent, to make electrode. Use lithium as opposite electrode, use 1M LiPF$_6$ three components mix solvent EC:DMC:EMC=1:1:1, v/v as electrolyte, use polypropylene microporous membrane as isolation membrane, to assemble simulate battery. Use 0.5 mA/cm$^2$ current density for constant current charge-discharge experiment, charge-discharge voltage is 0~2.0 v, to test the reversible capacity. Cycle performance is test by product battery. Use LiCoO$_2$ as anode, use 1M LiPF$_6$ three components mix solvent EC:DMC:EMC=1:1:1, v/v as electrolyte, use polypropylene microporous membrane as isolation membrane, to assemble product battery. Charge and discharge the battery with the rate of 1C, discharge voltage is limited within 4.2~3.0 v, and test the capacity retention $C_{500}/C_1$ of 500 cycles.

The Second Embodiment

Grind 200 kg natural graphite with granularity of 75 µm, 90% carbon, by the rotating high-speed grinder at 5500 rpm for 20 minutes, then make sphere by the low-speed impact sphere making mill at 2500 rpm for 60 minutes. After the air classifier adjusts the particle size distribution, add 100 kg of this graphite into reactor, add sulfuric acid and nitric acid mixture 35 kg, mix with water and stir at 360° C. for 15 minutes, and stir recirculate 12 hours. Add 15 kg ferric chloride, stir with water into paste form, and react for 2 hours. Cool down with water, and wash in the centrifugal filter equipment at the speed of 300 rpm, continuously add water to wash for 60 minutes to a neutral pH value. Centrifugal dewater until the water is less than 30%. Bake try in oven at 105° C. for 2 hours until water is less than 0.2%. The carbon content of the sample is 99.96%. Take 200 g of above sample, immerse into 8M AgNO$_3$ solution at 250° C. for 48 hours, the solid-liquid ratio is 2. After filtering, washing, and drying, mix the graphite 140 g, with 60 g polyvinyl alcohol water solution for 2 hours. After drying, increase the temperature to 450° C. with the speed of 1° C./min under the 1 liter/min nitrogen flow, keep this temperature for 10 hours, cool down to room temperature, and get the composite graphite. Use the same method of the first embodiment to make the electrode and to do the electrochemical testing.

The Third Embodiment

Grind 200 kg natural graphite with granularity of 45 µm, 90% carbon, by the rotating high-speed grinder at 5000 rpm for 30 minutes, then make sphere by the low-speed impact sphere making mill at 200 rpm for 80 minutes. After the air classifier adjusts the particle size distribution, add 100 kg of this graphite into reactor, add 35 kg mixture of sulfuric acid and nitric acid, mix with water and stir at 50° C. for 5 minutes, and stir recirculate 20 hours. Add 15 kg nitriloacetic acid, stir with water into paste form, and react for 4 hours. Cool down with water, and wash in the centrifugal filter equipment at the speed of 1500 rpm, continuously add water to wash for 10 minutes to a neutral pH value. Centrifugal dewater until the water is less than 30%. Bake try in oven at 360° C. for 2 hours until water is less than 0.2%. The carbon content of the sample is 99.95%. Take 200 g of above sample, immerse into 1M Ni(NO$_3$) solution at 25° C. for 48 hours, the solid-liquid ratio is 0.5. After filtering, washing, and drying, mix 188 g graphite, with 2 g acetylene black and 10 g polymethyl methacrylate toluene solution for 2 hours. After drying, increase the temperature to 3000° C. with the speed of 10° C./min under the 5 liter/min nitrogen flow, keep this temperature for 1 hours, cool down to room temperature, and get the composite graphite. Use the same method of the first embodiment to make the electrodes and to do the electrochemical testing.

The Fourth Embodiment

Grind 200 kg natural graphite with granularity of 45 µm, 99.8% carbon, by the rotating high-speed grinder at 4500 rpm for 40 minutes, then make sphere by the low-speed impact sphere making mill at 1800 rpm for 100 minutes. After the air classifier adjusts the particle size distribution, add 100 kg of this graphite into reactor, add 50 kg mixture of sulfuric acid, hydrochloric acid and nitric acid, mix with water and stir at 200° C. for 15 minutes, and stir recirculate 12 hours. Add 20 kg hydrofluoric acid, stir with water into paste form, and react for 10 hours. Cool down with water, and wash in the centrifugal filter equipment at the speed of 1100 rpm, continuously add water to wash for 30 minutes to a neutral pH. Centrifugal dewater until the water is less than 30%. Bake try in oven at 360° C. for 2 hours until water is less than 0.2%. The carbon content of the sample is 99.993%. Take 200 g of above sample, immerse into 1M $SnCl_4$ solution at 60° C. for 24 hours, the solid-liquid ratio is 0.1. After filtering, washing, and drying, mix the graphite 185 g, with 5 g carbon nanotube and 10 g polyvinylidene difluoride NMP solution for 2 hours. After drying, increase the temperature to 1000° C. with the speed of 10° C./min under the 5 liter/min nitrogen flow, keep this temperature for 2 hours, cool down to room temperature, and get the composite graphite. Use the same method of the first embodiment to make the electrodes and to do the electrochemical testing.

The Fifth Embodiment

Grind 200 kg natural graphite with granularity of 75 μm, carbon 99%, by the rotating high-speed grinder at 400 rpm for 50 minutes, then make sphere by the low-speed impact sphere making mill at 1500 rpm for 120 minutes. After the air classifier adjusts the particle size distribution, add 100 kg of this graphite into reactor, add 50 kg mixture of sulfuric acid, hydrochloric acid and nitric acid, mix with water and stir at 200° C. for 10 minutes, and stir recirculate 16 hours. Add 25 kg phosphoric acid, stir with water into paste form, and react for 10 hours. Cool down with water, and wash in the centrifugal filter equipment at the speed of 1000 rpm, continuously add water to wash for 30 minutes to a neutral pH. Centrifugal dewater until the water is less than 30%. Bake try in oven at 105° C. for 2 hours until water is less than 0.2%. The carbon content of the sample is 99.91%. Take 200 g of above sample, immerse into 1M $Cr(NO_3)_3$ solution at 80° C. for 24 hours, the solid-liquid ratio is 0.5. After filtering, washing, and drying, mix 140 g graphite, with 2 g acetylene black and 60 g polyvinyl alcohol water solution for 2 hours. After drying, increase the temperature to 2000° C. with the speed of 5° C./min under the 5 liter/min nitrogen flow, keep this temperature for 10 hours, cool down to room temperature, and get the composite graphite. Use the same method of the first embodiment to make the electrodes and to do the electrochemical testing.

The Sixth Embodiment

Grind 200 kg natural graphite with granularity of 45 μm, 99% carbon, by the rotating high-speed grinder at 3600 rpm for 60 minutes, then make sphere by the low-speed impact sphere making mill at 1200 rpm for 140 minutes. After the air classifier adjusts the particle size distribution, add 100 kg of this graphite into reactor, add 50 kg mixture of sulfuric acid, hydrochloric acid and nitric acid, mix with water and stir at 300° C. for 15 minutes, and stir recirculate 1 hours. Add 20 kg phosphoric acid, stir with water into paste form, and react for 2 hours. Cool down with water, and wash in the centrifugal filter equipment at the speed of 1000 rpm, continuously add water to wash for 30 minutes to a neutral pH. Centrifugal dewater until the water is less than 30%. Bake try in oven at 105° C. for 2 hours until water is less than 0.2%. The carbon content of the sample is 99.94%. Take 200 g of above sample, immerse into 1M $V_2O_5$ ammonia solution at 80° C. for 24 hours, the solid-liquid ratio is 0.5. After filtering, washing, and drying, mix the graphite 178 g, with 2 g conductive carbon black Super-P and 20 g carboxymethyl cellulose water solution for 2 hours. After drying, increase the temperature to 900° C. with the speed of 5° C./min under the 3 liter/min nitrogen flow, keep this temperature for 3 hours, cool down to room temperature, and get the composite graphite. Use the same method of the first embodiment to make the electrodes and to do the electrochemical testing.

The Seventh Embodiment

Grind 200 kg natural graphite with granularity of 75 μm, carbon 95%, by the rotating high-speed grinder at 3300 rpm for 70 minutes, then make sphere by the low-speed impact sphere making mill at 900 rpm for 160 minutes. After the air classifier adjusts the particle size distribution, add 100 kg of this graphite into reactor, add 35 kg mixture of sulfuric acid and nitric acid, mix with water and stir at 360° C. for 15 minutes, and stir recirculate 12 hours. Add 15 kg ferric chloride, stir with water into paste form, and react for 2 hours. Cool down with water, and wash in the centrifugal filter equipment at the speed of 300 rpm, continuously add water to wash for 60 minutes to a neutral pH. Centrifugal dewater until the water is less than 30%. Bake try in oven at 100° C. for 2 hours until water is less than 0.2%. The carbon content of the sample is 99.98%. Take 200 g of above sample, immerse into 1M $Cu(NO_3)_2$ solution at 80° C. for 24 hours, the solid-liquid ratio is 0.5. After filtering, washing, and drying, mix 180 g graphite, with 2 g acetylene black and 20 g polyacrylonitrile for 2 hours. After drying, increase the temperature to 1100° C. with the speed of 5° C./min under the 5 liter/min nitrogen flow, keep this temperature for 2 hours, cool down to room temperature, and get the composite graphite. Use the same method of the first embodiment to make the electrodes and to do the electrochemical testing.

The Eighth Embodiment

Grind 200 kg natural graphite with granularity of 75 μm, 99% carbon, by the rotating high-speed grinder at 300 rpm for 90 minutes, then make sphere by the low-speed impact sphere making mill at 600 rpm for 180 minutes. After the air classifier adjusts the particle size distribution, add 100 kg of this graphite into reactor, add 50 kg mixture of sulfuric acid, hydrochloric acid and nitric acid, mix with water and stir at 300° C. for 15 minutes, and stir recirculate 1 hours. Add 20 kg phosphoric acid, stir with water into paste, and react for 4 hours. Cool down with water, and wash in the centrifugal filter equipment at the speed of 1000 rpm, continuously add water to wash for 30 minutes to a neutral pH. Centrifugal dewater until the water is less than 30%. Bake try in oven at 105° C. for 2 hours until water is less than 0.2%. The carbon content of the sample is 99.94%. Take 200 g of above sample, immerse into 1M $AgNO_3$ solution at 80° C. for 24 hours, the solid-liquid ratio is 0.5. After filtering, washing, and drying, mix the graphite 170 g, with 5 g carbon nanotube and 25 g polystyrene for 2 hours. After drying, increase the temperature to 800° C. with the speed of 3° C./min under the 2 liter/min nitrogen flow, keep this temperature for 4 hours, cool down to room temperature, and get the composite graphite. Use the same method of the first embodiment to make the electrodes and to do the electrochemical testing.

Comparison Embodiment

Use natural graphite with granularity of 18 μm, 99% carbon as active cathode material, with the same method of the first embodiment to make the electrodes and to do the electrochemical testing.

Table 1 illustrates the electrochemical properties of the composite carbon negative electrodes of the Li-ion battery of the embodiments mentioned above, wherein the measured electrochemical properties of the composite carbon negative electrode materials in the Li-ion battery are shown in Table 1.

The Li-ion battery of the present invention can be widely used in mobile phone, laptop computer, camcorder, portable equipment, and tool. It can be fabricated in different shape, and adapted to different area.

One skilled in the art will understand that the embodiment of the present invention as shown in the drawings and described above is exemplary only and not intended to be limiting.

It will thus be seen that the objects of the present invention have been fully and effectively accomplished. It embodiments have been shown and described for the purposes of illustrating the functional and structural principles of the present invention and is subject to change without departure from such principles. Therefore, this invention includes all modifications encompassed within the spirit and scope of the following claims.

TABLE 1

| Number | Particle size $D_{50}$ μm | Tap density g/cm$^3$ | Specific surface area m$^2$/g | First time charge capacity mAh/g | First time discharge capacity mAh/g | 500 cycles capacity retention % |
|---|---|---|---|---|---|---|
| Embodiment 1 | 18.395 | 1.432 | 0.734 | 388 | 365 | 87.1 |
| Embodiment 2 | 5.364 | 1.006 | 2.354 | 391 | 368 | 85.3 |
| Embodiment 3 | 34.321 | 1.235 | 1.328 | 383 | 362 | 84.4 |
| Embodiment 4 | 22.035 | 1.124 | 2.458 | 390 | 371 | 82.3 |
| Embodiment 5 | 16.352 | 1.162 | 1.225 | 378 | 359 | 82.1 |
| Embodiment 6 | 17.912 | 1.131 | 1.435 | 382 | 361 | 86.4 |
| Embodiment 7 | 18.035 | 1.126 | 1.687 | 380 | 363 | 83.3 |
| Embodiment 8 | 17.952 | 0.795 | 3.731 | 395 | 371 | 86.1 |
| Comparison | 17.931 | 1.017 | 5.321 | 362 | 321 | 51.6 |

What is claimed is:

1. A method of preparing a composite carbon negative electrode which has a reversible specific capacity larger than 350 mAh/g, a coulomb efficiency higher than 94% at a first cycle and a conversation rate for capacity larger than 8% in 500 times of circulation, wherein said method comprises the steps of:

(a) crushing graphite with particle size of approximately 45 to 500 μm to form graphite powders at a speed of approximately 3000 to 6000 rpm, for approximately 10 to 90 minutes in a mill;

(b) shaping and sphericizing said graphite powders into spherical graphite at a speed of approximately 600 to 3000 rpm, for approximately 40 to 180 minutes in an impact sphericizing mill;

(c) classifying said spherical graphite by a classifier to remove particles smaller than 5 μm and larger than 75 μm, to get particles with a size of 5 μm~75 μm, a tap density of 0.95~1.05 g/cm$^3$, and a specific surface area of 4.0~7.5 m$^2$/g, and purifying remaining spherical graphite by the following steps to form a predetermined amount of purified graphite;

(c1) feeding said remaining spherical graphite and an oxidizer into a reactor, wherein said oxidizer is peroxyacetic acid;

(c2) stirring with water for approximately 5 minutes to 15 minutes to form a mixture of said remaining spherical graphite and said water;

(c3) stir re-circulating said mixture for approximately 1 hour to 20 hours at a temperature of approximately 50° C. to 360° C.;

(c4) adding a complexing agent and reacting for approximately 2 hours to 10 hours so that contents of trace elements of Cu, Cr, Zn, and Mn in said remaining spherical graphite are less than 50 ppm individually, and a total amount of said trace elements is less than 150 ppm;

(c5) washing said remaining spherical graphite with water continuously for approximately 10 minutes to 60 minutes;

(c6) centrifugal dewatering said remaining spherical graphite; and (c7) drying said remaining spherical graphite at approximately 100° C.~360° C. until water content of said graphite powders is less than 0.2%;

(d) washing said purified graphite with water until a pH value thereof is neutral, then, dewatering and drying said purified graphite to become dried graphite;

(e) immersing said dried graphite into a multi-valent transition metal slate solution with a concentration of 0.1 M to 8M for approximately 1 to 48 hours, at a temperature of approximately 25° C. to 100° C., wherein a solid-liquid weight ratio of said multi-valent transition metal slate solution is 0.1~2, wherein said multi-valent transition metal element inserted between graphite crystal layers is 1~10% atom ratio, wherein said multi-valent transition metal element is Cr, wherein a graphite crystal layer spacing is 0.3368~0.3369 nm at $d_{002}$; and filtering, dewatering and drying;

(f) coating said spherical graphite with an organic matter to form a coated graphite that said spherical graphite is coated with a coating layer, wherein said spherical graphite is coated with said organic matter by a coating method which is one of liquid coating, melt coating, and mixed solid coating, wherein said coating layer is organic pyrolytic carbon, wherein said multi-valent transition metal element is inserted into said spherical graphite before said spherical graphite is coated with said coating layer, wherein the step (f) further comprises a step of adding conductive agent when said spherical graphite is coated with said organic matter, wherein said conductive agent is one of carbon nanotube, and carbon fiber, wherein a mass percent of said conductive agent in a mixture of said spherical graphite, said conductive agent, and said coating layer is 1%~3%, wherein a coating material used in step (f) is one of water-soluble styrene butadiene rubber emulsion SBR, carboxymethyl cellulose CMC, the organic solvent of polymethyl methacrylate, polytetrafluoroethylene, and polyvinylidene difluoride, and (g) carbonizing or graphitizing said coated graphite, heating in a protection gas at a temperature of approximately 450° C. to 3000° C., keeping said temperature for approximately 1 hour to 10 hours, cooling down to room temperature, wherein said graphite is one of natural flake graphite, microcrystalline graphite, artificial graphite, and mesocarbon microbeads, wherein a heating rate of change of temperature in the step (g) is 1° C./min~10° C./min;

wherein said composite carbon negative electrode, prepared through said above method has average article diameter $D_{50}$ of 5~60 μm, tap density of 0.7~1.5/cm$^3$, and specific surface area BET of 0.5~4.0 m$^2$/g.

* * * * *